(12) United States Patent
Bruestle et al.

(10) Patent No.: US 9,391,806 B2
(45) Date of Patent: Jul. 12, 2016

(54) METHOD AND APPARATUS FOR SECURE COMMUNICATIONS AND RESOURCE SHARING BETWEEN ANONYMOUS NON-TRUSTING PARTIES WITH NO CENTRAL ADMINISTRATION

(75) Inventors: Jeremy Bruestle, Seattle, WA (US); Mark L. Tucker, Seattle, WA (US)

(73) Assignee: COCO Communications Corp., Seattle, WA (US)

( * ) Notice: Subject to any disclaimer, the term of this patent is extended or adjusted under 35 U.S.C. 154(b) by 0 days.

(21) Appl. No.: 13/492,169

(22) Filed: Jun. 8, 2012

(65) Prior Publication Data

US 2012/0311334 A1 Dec. 6, 2012

Related U.S. Application Data

(63) Continuation of application No. 12/018,032, filed on Jan. 22, 2008, now abandoned, which is a continuation of application No. 10/542,824, filed as application No. PCT/US2004/001458 on Jan. 21, 2004, now abandoned.

(60) Provisional application No. 60/442,328, filed on Jan. 24, 2003.

(51) Int. Cl.
*H04L 29/06* (2006.01)
*H04L 12/54* (2013.01)
(Continued)

(52) U.S. Cl.
CPC ............ *H04L 12/5695* (2013.01); *H04L 12/44* (2013.01); *H04L 45/04* (2013.01); *H04L 45/46* (2013.01); *H04L 47/125* (2013.01); *H04L 47/16* (2013.01); *H04L 47/2441* (2013.01); *H04L 47/41* (2013.01); *H04L 47/746* (2013.01); *H04L 47/782* (2013.01); *H04L 47/805* (2013.01); *H04L 47/806* (2013.01); *H04L 47/822* (2013.01); *H04L 47/828* (2013.01); *H04L 63/061* (2013.01); *H04L 63/08* (2013.01); *H04L 63/10* (2013.01); *H04L 63/1458* (2013.01); *H04L 41/0893* (2013.01);
(Continued)

(58) Field of Classification Search
None
See application file for complete search history.

(56) References Cited

U.S. PATENT DOCUMENTS 5,784,560 A 7/1998 Kindon et al.
5,987,011 A 11/1999 Toh
(Continued)

FOREIGN PATENT DOCUMENTS

JP 2002232410 A 8/2002
WO 0030295 A2 5/2000
(Continued)

*Primary Examiner* — Benjamin Lanier
(74) *Attorney, Agent, or Firm* — Lowe Graham Jones PLLC

(57) ABSTRACT

A unifying network model with a structure and architecture configured to address security, interoperability, mobility, and resource management, including priority and quality of services is provided. The network of the network model is structured as a hierarchical mesh network, with dynamically generated routing tables. The configuration of the network model optimizes routing and distributes communication load. Every device on the network is capable of being both an endpoint and a forwarder of communications. The network model may include underlying networks that are represented with one of two models, the link model or the star model. The nodes are organized in a hierarchical relationship structure to optimizes throughput. The model may include a cryptographic method of dynamically assigning local network addresses.

20 Claims, 1 Drawing Sheet

(51) Int. Cl.
  *H04L 12/44* (2006.01)
  *H04L 12/715* (2013.01)
  *H04L 12/803* (2013.01)
  *H04L 12/801* (2013.01)
  *H04L 12/851* (2013.01)
  *H04L 12/891* (2013.01)
  *H04L 12/911* (2013.01)
  *H04L 12/927* (2013.01)
  *H04L 12/24* (2006.01)
  *H04W 40/02* (2009.01)
  *H04W 40/24* (2009.01)

(52) U.S. Cl.
  CPC .......... *H04L 63/0428* (2013.01); *H04W 40/02* (2013.01); *H04W 40/246* (2013.01); *H04W 40/248* (2013.01); *Y02B 60/33* (2013.01)

(56) References Cited

U.S. PATENT DOCUMENTS

| | | |
|---|---|---|
| 6,571,222 B1 * | 5/2003 | Matsumoto et al. ............ 705/80 |
| 6,718,394 B2 | 4/2004 | Cain |
| 6,721,555 B1 * | 4/2004 | Phillips et al. ................. 455/411 |
| 6,738,900 B1 * | 5/2004 | Hardjono et al. .............. 713/156 |
| 6,757,823 B1 * | 6/2004 | Rao et al. ....................... 713/153 |
| 6,987,764 B2 | 1/2006 | Hsu |
| 7,089,298 B2 * | 8/2006 | Nyman et al. ................. 709/220 |
| 7,606,915 B1 * | 10/2009 | Calinov et al. ................. 709/229 |
| 2002/0051449 A1 | 5/2002 | Iwata |
| 2002/0191573 A1 | 12/2002 | Whitehill et al. |
| 2003/0002521 A1 * | 1/2003 | Traversat et al. .............. 370/465 |
| 2003/0037233 A1 * | 2/2003 | Pearson ......................... 713/156 |
| 2003/0204625 A1 | 10/2003 | Cain |
| 2003/0235175 A1 | 12/2003 | Naghian et al. |
| 2004/0003283 A1 * | 1/2004 | Goodman et al. ............ 713/201 |
| 2004/0139152 A1 * | 7/2004 | Kaler et al. .................... 709/203 |
| 2005/0132226 A1 * | 6/2005 | Wheeler et al. ............... 713/201 |

FOREIGN PATENT DOCUMENTS

| | | |
|---|---|---|
| WO | 0039967 A2 | 7/2000 |
| WO | 0249274 A2 | 6/2002 |
| WO | 02078229 A1 | 10/2002 |

\* cited by examiner

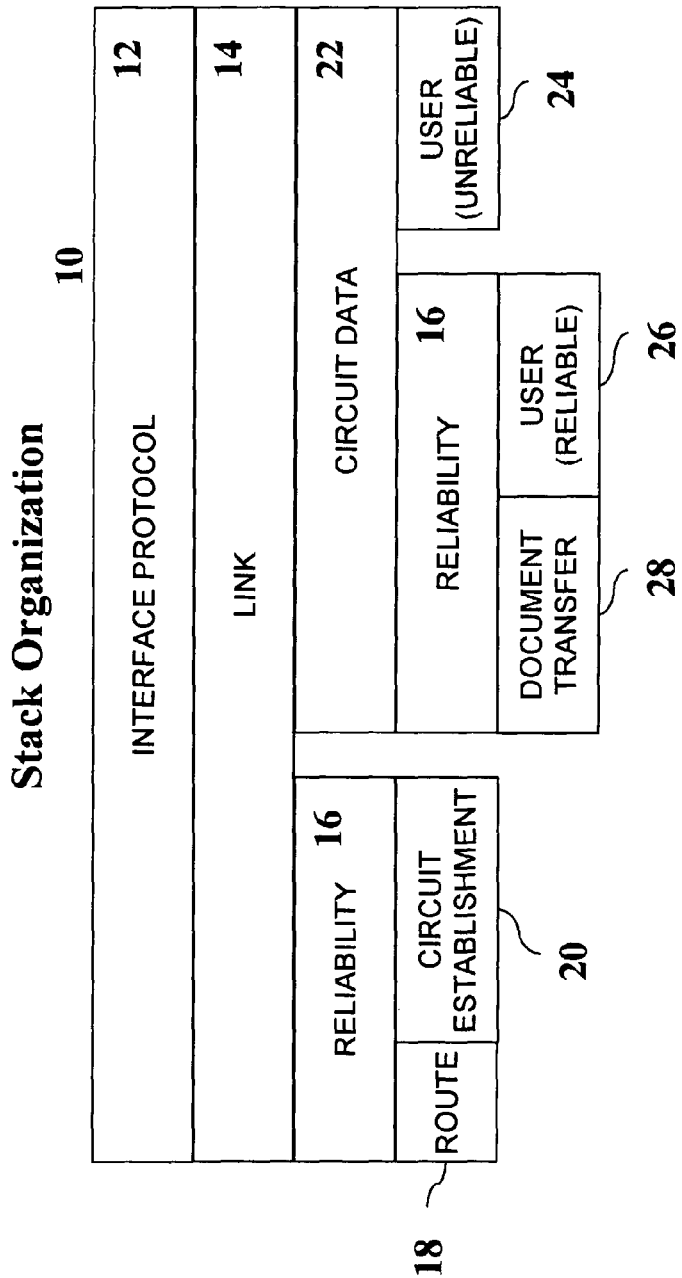

METHOD AND APPARATUS FOR SECURE COMMUNICATIONS AND RESOURCE SHARING BETWEEN ANONYMOUS NON-TRUSTING PARTIES WITH NO CENTRAL ADMINISTRATION

PRIORITY CLAIM

This application is a Continuation of U.S. Utility application Ser. No. 12/018,032, filed on Jan. 22, 2008, which is a Continuation of U.S. Utility application Ser. No. 10/542,824 filed on Jul. 20, 2005, which is a U.S. National Stage application of International Application No. PCT/US2004/001458 filed Jan. 21, 2004, which claims the benefit of U.S. Provisional Application Ser. No. 60/442,328, filed Jan. 24, 2003, all of which are hereby incorporated by reference in their entireties.

BACKGROUND

Today's communications requirements have outpaced the capabilities of current systems. There is a need for better security in both voice and data communications and an increased need to protect transmission streams. The same is true for radio mesh networks, which are made possible through advancements in radio technology, such as phased array antennas and consumer and enterprise adoption of wireless 802.11 access points. Such decentralized public mesh networks hinge on the ability for non-trusting parties to share and control network resources without the need for central administration.

While these heightened requirements coupled with the need for improved availability and reliability have brought network interoperability and unification to the forefront (e.g., some communication and network models have utilized patches at the application and operating system (OS) level to help satisfy some of these needs), such measures are alone not enough to provide needed levels of security and quality of service.

BRIEF DESCRIPTION OF THE DRAWINGS

FIG. 1 illustrates an example protocol stack of the network model.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well-known structures and functions have not been shown or described in detail to avoid unnecessarily obscuring the description of the embodiments of the invention.

It is intended that the terminology used in the description presented be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Further, the invention resides as well in sub-combinations of the features described below. The elements or features described in one embodiment may of course also be used in the other embodiments.

1. Overview

The following disclosure is directed to a unifying network model with a structure and architecture configured to address security, interoperability, mobility, and resource management, including priority and quality of services (QOS). The network of the network model is structured as a hierarchical mesh network, with dynamically generated routing tables. Every device on the network is capable of being both an endpoint and a forwarder of communications. The network model may include underlying networks that are represented with one of two models, the link model or the star model.

The term "node" is used to refer to an active component of the network. Nodes may differ in capability, but all follow the network model's basic routing protocols. Nodes are connected via any number of underlying network protocols. The network model supports a hierarchical network concept that allows groups of nodes to be viewed as a single group, allowing the dynamic routing mechanisms to scale to any size.

The network model employs a circuit based mechanism to create end to end connections between non-directly connected nodes. This mechanism is similar to asynchronous transfer mode (ATM). One of the two nodes wishing to communicate sends a circuit establishment request. This request is passed though the network based on routing tables and requirements of the circuit, and the circuit is built as a result of this request. Once the circuit is established, all packets traveling though the circuit take the same path.

This circuit mechanism gives the nodes some awareness of the higher level end-to-end connections. This allows QOS levels to be attached to given data flows. Decisions about QOS policy can be made at circuit construction time. These decisions are then enforced during course of the circuit's existence. In addition, routing is static per circuit, thus once a circuit is created, packet routing is simple and efficient.

The information needed to set up circuits; including inter-node connectivity and link quality of service data is transferred though the network via a hierarchical dynamic routing protocol. Thus each node is aware only of its name and its local connectivity. This information is propagated though the network in a way which reduces the amount of data which needs to be maintained in each node, while providing enough information for reasonably good circuit construction routing choices.

Cryptographic methods are used throughout the protocol to insure the safety, authenticity and correctness of the control data moving between nodes. This allows the end-to-end user data transport to be secure, the dynamic routing to be tamper resistant, the QOS to be cryptographically controlled, and generally prevents nearly all attacks on the network, including many denial of service (DOS) attacks. The assumptions of trust are very pessimistic, while still allowing useful work to be done among many untrusted nodes.

Another important concept of the network model is that of the "document." A document is a self contained, cryptographically signed, chunk of data understood and used by the network to make decisions. Much of the high level protocols, such as circuit establishment and dynamic routing involve the exchange of documents. The public key distribution mechanism operates on documents.

In addition, documents are used to define policy. This includes user and groups, as well as resource use policies, and delegation of power. Policy documents have names, and one can refer to a policy by its name. Many nodes can share the same policy, and track policy updates.

The use of documents requires some mechanism to organize and distribute documents throughout the network, and indeed there are protocols within the network model to do just this. In addition, some documents, such as routing updates have additional ways of moving themselves though the network that do not rely on a document transfer protocol.

1.1 Protocol Stack

Referring to the FIGURE, the protocol stack 10 of the network model does not fit perfectly into the Open System Interconnection (OSI) seven layer network model. This is due, at least in part, to the intentional interdependence between the ability of the nodes to have some awareness of the higher level end-to-end connections and the ability for hop-by-hop routing choices. This interdependence allows detailed QOS to be enforced. In addition, security is embedded at a lower layer, again in an attempt to gain further functionality and integration.

The protocol stack 10 includes an interface protocol 12, which is the underlying protocol used for inter-node communications. The interface protocol 12 need not be consistent throughout the network; indeed it may differ on a node-by-node or link-by-link basis, and there may even be multiple different interface protocols connecting the same nodes.

The protocol stack 10 includes a link protocol 14 above the interface protocol 12. The link protocol 14 is in charge of initiating communications with a neighbor, determining the neighbor's name, establishing basic link cryptographic communications, etc. In addition, the link protocol 14 is the base for QOS mechanisms.

The protocol stack 10 may also include a lightweight reliability protocol 16 that allows for reliable sequenced streams over unreliable packet traffic. The reliability protocol 16 is used by both system level and user level protocols, and is used in multiple locations within the protocol stack 10.

The protocol stack 10 includes a routing protocol 18 to handle the movement of routing data through the network. The routing protocol 18 is in charge of making sure the network keeps aware of the current interconnectivity status, as well as the current QOS situation. It deals with the network as a hierarchical system of nodes, networks, networks of networks, etc.

A circuit protocol (20 and 22) of the protocol stack 10 handles the establishment of end to end connections and the long haul transfer of data. The circuit protocol (20 and 22) is divided into the circuit establishment protocol 20, which sets up circuits, and the circuit data protocol 22, which moves date over circuits. All user data is transported over the circuit data protocol 22, either as raw packets (unreliable circuit 24), or as reliable streams by use of the reliability protocol (reliable circuit 26).

A document transfer protocol 28 of the protocol stack 10 makes use of user signed data components known as "documents" (described in more detail below). Sometimes a node may need to track down a document that it needs for some reason. The document transfer protocol 28 handles the process of finding the document by name and moving the document to the requesting node.

1.2 Node Concepts

All of the network model's protocol-speaking devices are nodes, including both endpoints and intermediate points. Each node has a single unique network address. This takes the form of a hierarchical name. Naming of nodes is used to help determine the routing structure and the propagation of the dynamic routing data. Each name is represented as a dot separated list of identifiers, with the most specific portion of the node name coming first, and the most general coming last. For example with the name machine1.floor2.seattleOffice.ibm, the highest level part of the name is at a similar level to the autonomous system number of border gateway protocol (BGP). This naming format, referred to in this document as "dot path naming format" is used to name many aspects of the network, including users, groups, networks, documents, policies, or in this case node. In each case the hierarchy has a well-defined meaning.

1.2.1 Inter-Node Connectivity

Each node in the network model is able to communicate with one or more other nodes directly. These nodes are referred to as neighbors, or sometimes as direct nodes. The underlying protocol used by neighboring nodes to communicate is for the most part unimportant to the network layer. The following guidelines determine what underlying transport protocols are appropriate:

May be connection oriented or connectionless.
May be unreliable or reliable
Fits either the link or star model described below
Packetizes data in some way
Has a packet maximum transmission unit (MTU) (real or virtual) of 512 bytes or more.
Is two way, in that if node A can send to node B, node B can send to node A
May duplicate or reorder packets Each node has a method of determining its neighbors, initiating a physical connection for connection oriented underlying protocols, and exchanging packets. Finding the physical/logical neighbors may be done through some discovery protocol, or the list of desired neighbors could be determined by a user or other configuration.

The network model supports two basic types of node connectivity: edges and stars.

The word edge comes from the graph theory term. An edge is a connection between nodes that represents a simple point-to-point connection. This could be for example a node within radio proximity, or a node on the other end of a private T1. The fact that a node A has edges to two different nodes, B, and c has no bearing on whether or not B and c have an edge connecting them. The requirements of a edge include bidirectionality and some form of packet based transport; although in the case of a non-packetized physical link, packets could be easily be introduced via a framing mechanism of some sort.

A star is used to represent some form of shared transport mechanism that connects a number of nodes in such a way that the transitive property of connectivity holds among them. An example of a star would be a number of nodes connected to an Ethernet switch. If node A can send packets to node B as well as node c via the Ethernet switch, then both B and c can send packets back and forth via the same Ethernet switch. Thus, a star can be thought of as the center of a group of communicating nodes. Radio networks are usually not stars. Another way to look at stars is as the equivalency classed of connectivity.

1.2.2 Hierarchical Structure

The naming of nodes introduces a hierarchical structure to the network, in that networks of nodes combine to form networks of networks, and networks of networks of networks, etc. A group of nodes, which are part of the same network group, or a group of networks, which are grouped together, are often referred to as a meta-node. This is because whole networks of nodes can be looked at as a single node, and the inter-network connectivity as edges between these meta-nodes.

The highest level meta-nodes form the global network, or root level network. In the Internet model, these would be the networks assigned ASN's. Each of these root level networks, or meta-nodes, can contain internal structure. The depth of the structure before one hits the actual physical node does not have to be consistent throughout the networks. That is, a meta-node composed of three smaller nodes, and a single individual node can be peers in a network. In terms of dot path node names, a.b.c and x.c could both be nodes, and b.c (a meta-node) and x.c (a real node) would be peers in network c.

When grouping nodes into a meta-node, all the nodes in the group are fully connected. That is, for any two chosen nodes in the group, there is a path consisting of only other nodes within the group, which connects them. Obviously nodes which are on the same star make a great grouping. In some cases, a meta-node may "split" in that the failure of certain links causes the meta-node's components to no longer be fully connected. The network attempts to deal with this situation, but certain failure modes are possible, and one should avoid grouping nodes in such a way that one or two key links can split the group.

1.2.3 Dynamic Routes

The dynamic routing protocol 18 is in charge of propagating node connectivity and QOS data through the network. The hierarchical nature of the network and the full connectivity assumption are used to limit the flooding of route messages, and minimize the size of the route tables generated, thus making certain that the dynamic routing scales.

1.3 Document Concepts

Central to the network model is the document concept. A document in the network model is a self contained, signed chunk of data understood and used by the network to make decisions. For example, the public key distribution mechanism works though documents. The dynamic routing involves the exchange of route related documents. The QOS mechanism uses documents to define rights and delegations of rights for network usage. The actual circuit construction requests sent by users are documents.

1.3.1 Documents in General 1.3.1.1 Signatures

Documents are often signed. This signing uses a public key signature mechanism. Interestingly, documents are also used to distribute keys. There is a chain of trust to allow this mechanism to work, as well as a well-known root public key. Signing documents indicates that the signer "supports" the document. The meaning of "supports" depends upon the document in question. For example, if the document is an identity document, it means the signer vouches that the identity in question is legitimate. If the document is a circuit request, it means the signer is the user requesting the circuit.

1.3.1.2 Naming and Typing

Documents have a type associated with them and many have a name associated with them as well. The type is one of a predefined list of types, and each type has a different internal format. New document types may be added in alternative versions of the protocol. Unknown document types are ignored when present. Documents may also have a name. This name takes the form of a "dot path". A dot path is a dot-separated list of identifiers. An example of a dot path is this.is.a.test. A given type and dot path usually corresponds to a single unique document, and the document transfer protocol 28 is designed to find that document. However not all documents are long-term documents, including circuit request or dynamic routing updates. These documents have no names and propagate though some other means, and are called short term documents.

1.3.1.3 Time Scope

Documents also have a time scope. This may include a creation time and an expiration time. The expiration time is the time after which the document is no longer considered relevant. For example, dynamic route information from a mobile radio device has a fairly quick expiration, meaning the time during which it is useful is limited. It is assumed that there is fairly universal time synchronization among nodes. However, it is also assumed that while data from a given node can be time ordered with great reliability, inter-node times may be off by a few seconds to a minute. One-hour time skews may be considered unacceptable.

1.3.2 Document Types

The document concept supports a number of different document types and document type classes. Some of these, such as identity documents, are used in conjunction with other documents, in that many other documents rely on identity documents to be useful. In addition, there are a number of document types involved with the document transfer protocol 28, or in other words, documents relating to document movement and storage. A quick overview of document types is provided in this section. A more detailed description of the document format for a given document type is given in the section relating to the use of the document, with a few very basic documents in the section 4 on basic document types.

1.3.2.1 Identity Documents

To allow for a very flexible authorization mechanism, there needs to be a way to identify users, nodes, and other logical units of activity. In addition, it is valuable to be able to group these entities to allow for a single rule to be applied to an entire class of entities. To this end, a hierarchical identity naming mechanism is defined. This naming mechanism may recognize that a single human user may have more than one identity to correspond with multiple roles. For example, the user may have one identity as an employee of a company and another as a member of a social group. In addition, even within the user's company there may exist multiple roles for the different departments, etc., of which the user is a member. Also, non-human components of the network may have identities, for example every node has an identity, which is actually its network address.

Each identity is named via a dot path. Both the 'a.b.c' and 'b.c' can be valid identities at the same time, 'b.c' representing a group, and 'a.b.c' representing an individual or a sub-group. Each identity has a private and public key associated with it. The private key stays with the human or piece of equipment that the identity represents and the public key is distributed.

The identity document is a document connecting the identity and its public key. The identity name is the document name for the purposes of the document transfer protocol 28. Each identity document is signed by the public key of an identity higher in the hierarchy. Thus, a group can choose its users and subgroups, which can in turn choose subgroups of their own. In addition, there is a flag associated with the identity document as to whether the identity is a leaf identity, that is, one that cannot have sub-identities. The root identity document that is the public key needed to sign the c of a.b.c is assumed to exist on all nodes. Additional details regarding the identity document are provided in Section 4 below.

1.3.2.2 Storage Location Documents

The document transfer protocol 28 is used to find documents by name on the network. The document transfer protocol 28 relies on documents that link names to actual nodes. Storage location documents facilitate this process. A storage location document gives a node names of nodes that contain information about a given sub-tree of document names. For example, there may be a storage location for ibm.corp.us that points to a node that is one of IBM's document storage servers.

The name of the storage location document is the tree for which it is authoritative. The node the document points to either contains every document in that tree, or contains storage location records for more specific sub-trees for documents it does not store. There may be more than one storage location record for the same name, allowing for multiple document storage servers. For a document storage location to be valid it is signed by an identity, which is equal to or higher than the sub-tree it stores. Additional details regarding the storage location document are provided in Section 11 below.

1.3.2.3 Logical Name Documents

Logical name documents can be used to give other types of documents a more human acceptable, or organizationally structured view of the world. Logical name documents can also be used to implement redirection strategies. A logical name document is a logical dot path (its key for lookup), an actual dot path, and document type. It is signed by an identity equal or higher than it is logical dot path. It redirects to its actual dot path. Additional details regarding the logical name document are provided in Section 11 below.

1.3.2.4 Route Update Documents

There are a number of routing related documents passed between nodes during the process of moving routing data. All these documents are unnamed and do cannot be lookup up via the document transfer protocol 28. Additional details regarding the route update document are provided in Section 9 below.

1.3.2.5 Metric Policy Documents

Metric policy documents give nodes information to use in deciding the permissions and delegations used to make circuit establishment and data movement decisions. Basically, they store the QOS policies. They each have a dot path name, which allows policies to reference other policy, and to lookup new policy documents as old policy expiration dates expire. The document is signed by an identity equal to or higher than their name. Additional details regarding the metric policy document are provided in Section 10 below.

1.3.2.6 Circuit Request Documents

These are unnamed documents (in that they do not have a dot path and are not stored in a document storage server). They contain actual requests for circuit construction. Such unnamed documents are signed by the identity desiring the circuit to be constructed. Additional details regarding the circuit request documents are provided in Section 10 below.

1.3.2.7 Link Setup Documents

These are unnamed documents (in that they do not have a dot path and are not stored in a document storage server). They are used to set up a link and exchange keying information used to secure the link. Such unnamed documents are signed by the node initiating the link setup. Additional details regarding the link setup documents are provided in Section 8 below.

2. Conventions and Basic Types

The following description presents conventions used to describe the protocols discussed above. In addition the following description presents basic fundamental data types for use in building more complex data types.

2.1 Conventions

2.1.1 Typing

To describe both in memory state as well as the logical form of various data moved across the network, a simple, semi-formal typing system is introduced. Given parts of data are represented via various types and there are a number of ways of combining simple types into more complex types. The details of in-memory representation used in actual implementation are not important, and indeed the types used do not need to be the same, as long as the semantics are preserved.

2.1.2 Encoding

In addition to the logical form of types, some types have an encoding as well. This encoding represents the way the type is turned into a sequence of bytes for movement over the network. To facilitate multiple implementations of the protocol to interoperate, encoding may match the description identically.

2.1.3 Protocol Data Units

A protocol data unit (or PDU) is a named type, which is also a basic conversational unit of the protocol. At the lowest level, the protocol can be looked at as the exchange of PDUs, and the associated change in state of the various nodes involved. In addition to these physical PDUs there are also cases where a logical PDU description is used to represent an application programmer interface (API) to lower level aspects of the implementation. A PDU-like description is also used to represent the high level API that the protocols export. Thus, interfacing with other components of the system is similar to sending and receiving data with other nodes. The actual implementation need not use this metaphor, but the descriptions all do.

2.2 Basic Types

2.2.1 TYPE: Integer types U# and S#

The integer type are U8, U16, U32, U64, S8, S16, S32, S64 and represent unsigned and signed integers of various size ranges. The U (or S) represents unsigned or signed respectively and the number following the letter represents the number of bits used to represent the number. Thus, a U8 can store a number from 0 to 255, and a S16 can store a number from −32768 to 32767. In general, given the number of bits n, unsigned numbers go from 0 to $2^{n-1}$, and signed numbers go from $-2^{n-1}$ to $2^{n-1}-1$.

The encoding of the integer types as byte sequences is basic two's complement binary representation. For multi-byte integers, network byte order (big-endian) representation is used.

2.2.2 TYPE: VarInteger

The variable integer type is used to represent unsigned integers. Logically, it is capable of storing a number between 0 and $2^N-1$. The variable nature comes in its encoding, where N is a self-sizing variable size, with smaller numbers taking up less space.

If the value of the number if between 0 and 127 ($2^7-1$), the encoding of the value is one byte, standard binary integer representation. If the value is between 128 and $2^{14}-1$, it is stored in two bytes. This is a standard network order two byte integer, with the exception that the most significant bit of the first byte is set to 1. If the value is greater than $2^{14}-1$ the number is stored as a standard network order four-byte integer, with the exception that the two highest order bits of the first byte are both set to 1.

2.2.3 TYPE: TimeLocation

The time location type represents a point in time. That is, a particular moment. For example, Jan. 2, 2002, 7:30 PM, CST could be one way to represent a time location. Time locations represent actual absolute time, not wall time, and are thus not effected by time zones.

Time locations are encoded as an S64 representing the number of nanoseconds since Jan. 1, 2001, UTC.

2.2.4 TYPE: TimeDuration

The time duration type defines a relative difference between two time locations, or in other words, a duration.

Time duration is represented as an S64 representing the number of nanoseconds that make up the duration.

2.3 Cryptographic Types

2.3.1 TYPE: Hash

The hash type represents a cryptographic hash of a byte sequence. The hash of a logical structure refers to the hash of the byte sequence that is the encoding of the logical structure described. When a hash is referred to as being over a number of logical components, it is assumed to be the hash of the byte sequence formed by concatenating the encoding of each component in the order they are mentioned in the description of what to be hashed.

In addition a hash may be "keyed" by some value. This means that the key is encoded and placed both before and after the encoding of the object being hashed, and the hash value is the result of hashing this new sequence. This keying allows for symmetric key signatures, in that one can verify the sender of a piece of data hashed in a keyed manor knew the same hash key.

While alternative implementations of the protocol may support multiple, negotiable cryptographic hash algorithm choices, the illustrated embodiment uses the MD5 cryptographic hash. The details of turning a sequence of bytes into the hash, and representing the resulting 128 bit hash as a sequence of 16 bytes is described in a document available from RSA Security, Inc. ("RSA") of Bedford Mass.

2.3.2 TYPE: Signature

The signature type represents a public key signature of some data. Generally, due to the constraints on the size of the data the signature is made over, this signature is of a cryptographic hash, which is a hash of some section of data. So long as the cryptographic hash is trusted, the public key signature can be thought of as being over the entire data block which is the input to the hash.

While alternative implementations of the protocol may support multiple, negotiable public key signature algorithm choices, the current version used the RSA public key signature algorithm. The details of this algorithm and the representation of the resulting signature are described in a RSA document.

2.3.3 TYPE: PublicKey

The public key type represents a public key capable of being used for encoding and signature verification with a certain public key encryption and signing mechanism. If the encryption and signing do not use the same key, a public key type contains both keys.

While alternative implementations of the protocol may support multiple, negotiable public key signature and encryption algorithm choices, the illustrated embodiment uses the RSA public key algorithms. The key is a 2048 bit RSA key, encoded as described in the appropriate prior art RSA documentation.

2.3.4 TYPE: SymmetricKey

The symmetric key represents a key that can be used to do encryption and decryption using a symmetric cipher.

While alternative implementations of the protocol may support multiple, negotiable symmetric key ciphers, the illustrated embodiment uses DES, the key format of which is developed and documented by RSA.

2.3.5 TYPE: PublicEncoded

The public encoded type represent a public key encoding of some data. Generally, due to the constraints on the size of the data the encoding is made over, this encoding is a symmetric key, which is used to encode other data.

While alternative implementations of the protocol may support multiple, negotiable public key encoding algorithm choices, the illustrated embodiment uses the RSA public key encoding algorithm. The details of this algorithm and the representation of the resulting encoding are described in RSA documentation.

2.3.6 TYPE: PreSymmetric

The presymmetric type represents the initialization vector or other preamble needed to make the symmetric cipher secure against certain attacks.

While alternative implementations of the protocol may support multiple, negotiable symmetric key ciphers the illustrated embodiment uses DES, the IV format of which is described in certain RSA documentation.

2.4 Combining Types

Various mechanisms for combining or modifying types may be in place to facilitate building complex types from simpler types. This section describes such mechanisms. Three primary complex types include: a sequence type, a set type, and a structure type. All of these types have a well-defined method of encoding, which is related to the method of encoding its base type or types.

2.4.1 Sequence

A sequence is an ordered list of elements all of the same type. It is represented by Sequence<Type> where Type is the type of all the sequence elements. Typical operation on a sequence might include inserting and removing elements, finding an element based on its location, iterating thought the elements in order, etc. When describing an offset within a sequence, a zero based index is used.

The in memory representation of a sequence is implementation-dependent and may vary from one context to another, even for sequences of the same type, based on how they are manipulated.

The encoding of a sequence as a sequence of bytes is the concatenation of the number of elements, represented as a VarInteger, with the encoding of each of its elements in order.

2.4.2 Set

A set in an unordered collection of elements all of the same type. It is represented by Set<Type> where Type is the type of all the set elements. Typical operations on a set might include finding elements that meet a certain requirement, set unions and intersections, modification of certain elements (which is equivalent to removing the original element and inserting the modified one). Another operation might be the transversal of the set in a random order, or some specific order based on a comparison function on the elements. Like mathematical sets, there cannot be two "copies" of identical elements within the set. All the uses of sets described within this document avoid this case.

The in memory representation of sets is often quite complex. While the set may be simply a collection of elements, the need to find elements based on some property quickly often necessitates some form of indexing. Indeed, in this detailed description, sets are often used as maps, which relate one element with another, by inserting the key-value pairs into the set. In addition, the need to transverse the set in some particular order often induces some complexity.

The encoding of a set as a sequence of bytes is the concatenation of the number of elements, represented as a VarInteger, with the encoding of every element of the set, in no particular order.

2.4.3 Structure

A structure consists of a sequential, named list of elements, each of its own type. It is used to combine various different parts to form a single whole. Table 1 below shows a typical definition of a structure:

TABLE 1

| Structure | |
| --- | --- |
| TypeOne | NameOne |
| TypeTwo | NameTwo |

In the example of Table 1 there are two parts of types. TypeOne and TypeTwo respectively. The names in the case of real structures help explain the meaning of the structure and give a way to refer to elements.

The encoding of a structure is simply the concatenation of the encoding of all the parts of the structure in the order given.

3. Document Encoding

Document encapsulation is the name for the process of converting the logical form of a document into a sequence of bytes for transfer via some network protocol, either the reliability protocol 16, or in the case of the link protocol 14, a special fragmentation mechanism. This chapter describes the relation between the logical and "physical" form (as the octet stream is referred) of the document.

3.1 Component Types

First we introduce some common, sub-components of documents and describe how to turn them into sequences of bytes.

3.1.1 TYPE: DotPath

A dot path is a dot separated list of identifiers. It is used in multiple locations within the protocols. Each identifier can be any textual sequence of printable glyphs, so long as it does not contain a "." which is the separating character. The sequence begins with and ends with an identifier and the dot appears only in the interior. Thus "a.b.c" is illegal as there is a dot at the end with no identifier that follows it.

In one embodiment, the dot path is encoded as a VarInteger representing the number of bytes in its UTF-8 representation, followed by the Unicode UTF-8 of the actual dot path in a textual manner.

3.1.2 TYPE: DocumentType

A document type is an enumeration type. Its definition is shown below in Table 2:

TABLE 2

Document Type Definition

| Name | Number |
|---|---|
| Identity | ? |
| StorageLocation | ? |
| LogicalName | ? |
| ControllerFlood | ? |
| CosignRequest | ? |
| NodeFlood | ? |
| EdgeFlood | ? |
| NextHopFlood | ? |
| InterconnectionFlood | ? |
| MetricPolicy | ? |
| CircuitRequest | ? |
| LinkSetup | ? |

The document type is encoded as a VarInteger representing the enumeration number.

3.1.3 TYPE: SignatureBlock

A signature block represents the signature of some thing, usually a cryptographic hash, by a particular identity. Its structure is shown below in Table 3:

TABLE 3

Signature Block

| DotPath | SignerIdent |
|---|---|
| Signature | SignerSig |

Where SignerIdent is the identity that is signing and SignerSig is the cryptographic signature of that particular signer.

3.2 Basic Document Structure

3.2.1 TYPE: Document

A document type represents the general format of a document, and the associated encoding. A portion of the document, referred to as the document body, is the type dependent portion of the document. An example of a document type structure is shown in Table 4 below:

TABLE 4

Document

| DocumentType | Type |
|---|---|
| DotPath | Name |
| TimeLocation | Expiration |
| ByteSequence | DocumentBody |
| Hash | DocumentHash |
| Set<SignatureBlock> | Signatures |

Referring to Table 4:

Type is the type of the document, an element of the enumeration given in earlier.

Name is the name of the document. For example, identity documents that contain the public key for a given identity are named with the identity they define. This is also the lookup key for the document transfer protocol 28. For unnamed documents types, this field is omitted from the structure.

Expiration is the time after which this document is no longer valid

DocumentBody is the main matter of the document and its meaning depends upon the Type given earlier. It is assumed that each document type describes a body encoding, and that this encoding is self sizing, thus the main document decoding logic is aware when the document body is done.

DocumentHash is the cryptographic hash of the elements Type, Name (if present) Expiration, and DocumentBody in that order.

Signatures is a list of signatures to this document by various parties. Each signature is a public key signing of the hash in DocumentHash.

Standard structure encoding, with the exception that Name is omitted for unnamed document types.

4. Basic Document Types

This section of the detailed description describes the basic document types that are used by multiple subsystems. In the exemplary embodiment, there is only one such document type: the identity document.

4.1 Identity Document

The identity document is used to connect an identity name with the identities public key. The identity document is signed by an identity higher on the signing tree to be valid. That is, the dot path of the signing identity is the proper suffix of the dot path of the identity document being signed. For example a.b.c could be signed by b.c but not d.c or x.a.b.c, etc.

4.1.1 TYPE: IdentityDocumentBody

The identify document may have a body portion consisting of PublicKey, which is the public key of the identity named in the document name.

5. Link and Circuit Metric Parameters

The link 14 and routing 18 protocols collect data for the purpose of determining QOS capabilities along certain paths. Users constructing circuits ask for certain QOS properties. In addition, there may be other factors, which the user might want to affect circuit routing, such as security clearance level, or other similar abstract aspects.

To allow for a general mechanism to be used for the propagation and manipulation of such data, the concept of a "metric parameter" is introduced. This is an aspect of a circuit or a link that might be a reasonable part of the decision process of circuit routing. All QOS parameters fall into the idea of metric parameters, as well as a number of more abstract things.

Thus each metric parameter represents a single measurable quantity of some sort. For example, bandwidth would be a metric parameter, as would latency. Each metric parameter has its own units of measurement. For example bps may be used for bandwidth and microseconds for latency.

In addition, there is support for two basic types of metric parameter values: numeric and symbolic. Symbolic parameters represent some logical aspect of the network the user might care about, such as "division" (for a corporation's internal use) or "ISP" (for the internet). These aspects may also effect routing choice.

As negotiations involve asking for required and desired amounts for various parameters (for example, XYZ requires 64 kbps, but would like 100 kbps), there is an understanding of which direction is "desirable". In the case of bandwidth, high numbers are desirable, in the case of latency, low numbers are desirable. In the case of symbolic parameters, which are given using DotPath naming, more specific or less specific may increase desirability.

5.1 TYPE: MetricParameter

A metric parameter type is used to specify which parameter is being discussed. To this end, each parameter is given a number, thus this type is an enumeration. Additionally, the metric parameters can be divided into four categories, NumericLow, NumericHigh, SymbolicSpec, SymbolicGen, where the first part names the basic type, and the second part specifies which direction is desirable. The type of numeric types is a Varinteger. The parameter type is a U16, with the first two bits deciding the category. An initial list is provided in Table 5 below:

TABLE 5

Metric Parameters

| Name | Units | Type | Number |
|---|---|---|---|
| Bandwidth | Bps * 100 | NumericHigh | 0 |
| Latency | Microseconds | NumericLow | 16384 |

In the illustrated embodiment, the metric parameter type uses standard U16 encoding.

5.1 Uses

Metric measurement idea can be employed for a number of uses, including:
- Measuring total and current available capacity/metrics on a both a per-circuit and cumulative bases (routing protocol 18)
- Specifying resource allocation policies (policy management)
- Specifying circuit requirements/desires (circuit construction)

The types for all these are described in the section that follow:

5.1.1 TYPE: CurrentMetricData

A current metric data type gives the total and current metric data of an edge. Included are the total and current best that a single path could receive, as well as the total and current cumulative over all paths. The structure for this type is illustrated in Table 6 below:

TABLE 6

Current Metric Data

| MetricParameter | WhichMetric |
| VarInteger | PerPathBestCapactity |
| VarInteger | PerPathBestUnused |

TABLE 6-continued

Current Metric Data

| VarInteger | TotalCapacity |
| VarInteger | TotalUnused |

In the case of symbolic types, an example of the structure is shown in Table 7:

TABLE 7

Symbolic Type

| MetricParameter | WhichMetric |
| VarInteger | PerPathBestCapactity |

In the illustrated embodiment, current metric data uses standard structure encoding, with the choice of structure determined by the first element.

Metric policy documents determine the division of resources into different uses, particularly nodes and users and sub-policies. Each policy has a name, which acts as the key for the policy document via the document transfer protocol 28. The policy then divides resources into groups and assigns each of the groups to a user, a node or meta-node, or a sub-policy. A given node is assigned a single master policy which is used to divide resources going in and out of it.

5.2.1 TYPE: SubholderType

A sub-holder type is used to define which of the three types of sub-holders is being used. It is a simple enumeration as, illustrated in Table 8 below:

TABLE 8

Subholder

| Name | Number |
|---|---|
| Sub-Policy | ? |
| User | ? |
| Node | ? |

5.2.2 TYPE: MetricPolicyComponent

Policy only applies to numeric metric parameters. A metric policy type represents the information about the absolute and relative access to the resource defined by a given metric parameter is and part of the policy document typing. An example structure for the metric policy type is shown in Table 9 below:

TABLE 9

Metric Policy

| MetricParameter | ParameterType |
| VarInteger | ReservedAmount |
| VarInteger | AbsolutePriority |
| VarInteger | RelativeOverflowPriority |

5.2.3 TYPE: MetricPolicyPart

Description

A policy part represents one of the eventual sub-holders of the resources granted to a policy. It describes the absolute and relative privileges of the sub-holder. An example structure for the policy part is shown in Table 10 below:

TABLE 10

| Policy Part | |
| --- | --- |
| SubholderType | Type |
| DotPath | SubholderName |
| Set<MetricPolicyComponent> | Params |

5.2.4 TYPE: MetricPolicyBody

The policy body is the body of the metric policy document. The key to a metric policy document is the name of the policy. The policy is signed by an identity more general than the policy name. An example structure for the policy body is shown in Table 11 below:

TABLE 11

| Policy Body | |
| --- | --- |
| Set<MetricPolicyPart | Subparts |

5.3 Metric Requirements

A third use of the metric system is specifying requirements during circuit construction. This is done using a single requirements type and a metric requirements type, which are illustrated below in Tables 12-14.

5.3.1 TYPE: SingleRequirement

TABLE 12

| Single Requirement Structure | |
| --- | --- |
| MetricParameter | Parameter |
| VarInteger | Required |
| VarInteger | Desired |

TABLE 13

| Symbolic Case Structure | |
| --- | --- |
| MetricParameter | Parameter |
| DotPath | Required |
| DotPath | Desired |

5.3.2 TYPE: MetricRequirements

TABLE 14

| Metric Requirements Structure | |
| --- | --- |
| Set<SingleRequirement> | Requirements |

6. Interface API Requirements 6.1 Introduction

A node of the network model calls a method on the interface API, which then uses the underlying interface's native protocol to transmit a packet, or perform some requested operation. Packets and events that enter the interface via the native protocols are converted to callbacks in the interface protocol 12 and sent up the protocol stack 10. Thus the interface API is the layer of abstraction that allows many types of physical networks to be dealt with in an equivalent manner. The process of calling API's and receiving callbacks is very similar to sending and receiving packets.

It is assumed this underlying protocol may have some addressing mechanism to allow links to multiple nodes to be reached via the same physical/logical interface, but it may be a simple point-to-point link as well. These remote addresses are interface specific and opaque to the higher-level protocols. The underlying protocol may be connection orientated, in which case the addresses define the locations to connect to, otherwise the addresses define a per-packet destination. The underlying protocol is packet based and each interface is given a well defined MTU for the data portion of the packet.

In addition, some interfaces (such as radio) may wish to alert the network layer of newly discovered remote nodes. Also, some interfaces (such as Ethernet) support broadcast of some form allow some method of node resolution, similar to ARP. The API supports both of these mechanisms.

6.2 Interface Protocol Base Types

Here the basic data types used for communication with the interface API are introduced.

6.2.1 TYPE: RemoteAddress

A remote address type provides an opaque representation of the remote address is understood by the interface. This type is not sent over the network, except by the interface itself perhaps, and thus does not have an encoding. Thus any structure containing it does not have an encoding.

6.2.2 TYPE: SeekReQuestID

A seek request ID type provides a number used by the higher level protocol to associate requests with responses. The in memory form is identical to a U32. This type is not sent over the network, except possibly by the interface itself, and thus does not have an encoding. Thus any structure containing it does not have an encoding.

6.3 Read and Write 6.3.1 API: SendPacket

A send packet function sends a packet down to the interface to be transmitted. Examples of parameters for the send packet function are illustrated in Table 15 below:

TABLE 15

| Send Packet Parameters | |
| --- | --- |
| RemoteAddress | Address |
| ByteSequence | PacketData |

In Table 15, Address is the remote address to send the packet to, and PacketData is the packet data, which is smaller than the MTU of the interface.

6.3.2 API: ReceivePacket

A receive packet function is called by the interface when it receives a packet. Examples of parameters for the receive packet function are illustrated in Table 16 below:

TABLE 16

| Receive Packet Parameters | |
| --- | --- |
| RemoteAddress | Address |
| ByteSequence | PacketData |

Referring to Table 16, Address is the remote address the packet arrived from, and PacketData is the packet data, which is smaller than the MTU of the interface.

6.4 Seeking 6.4.1 API: SeekNode

A seek node function sends a packet down to the interface to be transmitted. Examples of parameters for the seek node function are illustrated in Table 17 below:

TABLE 17

| Seek Node Parameters | |
| --- | --- |
| SeekRequestID | RequestNumber |
| DotName | NodeName |
| TimeDuration | Timeout |

Referring to table 17 RequestNumber is a U32 used to associate the resulting callbacks with this call, NodeName is the node name of the node being sought, and Timeout is the amount of time the node seeking is willing to wait to find the node sought.

6.4.2 API: SeekFound

A seek found function is called by the interface when it finds a node matching an outstanding request. Examples of parameters for the seek found function are illustrated in Table 18 below. After the seek found, the request ID is no longer in use and can be reused.

TABLE 18

Seek Found Parameters

| | |
|---|---|
| SeekRequestID | RequestNumber |
| Remote Address | Address |

Referring to Table 18, RequestNumber is the request this response is in relation to, and Address is the remote address of the found node, This remote address is now current (packets can be sent on it).

6.4.3 API: SeekFailure

A seek failure function is called by the interface when it times out trying to seek a node on the behalf of a caller. Examples of parameters for the seek failure function are illustrated in Table 19. After the seek failure, the request ID is not longer in use and can be reused.

TABLE 19

Seek Failure Parameters

| | |
|---|---|
| SeekRequestID | RequestNumber |

Referring to Table 19, RequestNumber is the request this response is in relation to.

6.5 Detection and Address Down

6.5.1 API: DetectNode

A detect node function is called when the interface detects another node on the network. Examples of parameters for the detect node function are illustrated in Table 20. This may happen when a node enters radio range, or for example when another node on a broadcast network sends a seek with the local node name.

TABLE 20

Detect Node Parameters

| | |
|---|---|
| RemoteAddress | Address |
| DotPath | NodeName |
| Bool | RemoteActive |

Referring to Table 20, Address is the address of the node detected, and NodeName is the probable name of the node. After receiving this call, Address is current (can have packets written to it). RemoteActive is a flag which indicates some level of initiative on the part of the remote node, and is a hint to not begin link negotiation, as the remote side intends to.

6.5.2 API: AddressDown

An address down function is called to alert the node that an address is no longer current and that the node no longer sends packets to it. Examples of parameters for the address down function are illustrated in Table 21.

TABLE 21

Address Down Parameters

| | |
|---|---|
| RemoteAddress | Address |

Referring to Table 21, Address is the address which is no longer current.

7. Reliability Protocol

7.1 Introduction

Instead of building TCP stream like reliability into a particular layer, a lightweight reliability protocol 16 is used throughout the design. The protocol needs room for three flag bits, and two 32 bit numbers, a sequence and acknowledge. It turns an unreliable, two way, packet transmission mechanism into a reliable one. The mechanism is the same as that used by TCP. One difference is since the concept of a channel (IP & Port) has been separated from the reliability aspect, there is no reason to require the two directions of the connection to open at the same time, thus one way reliable connections are allowed.

Only one stream in either direction is allowed per lower level two way connection. Attempting to start a new connection before receiving a confirmation of closing of the previous one is not allowed. The virtual PDU definition for the reliability layer is given below, the actual components may be placed into the underlying packet in any manor desired.

The details of the reliability protocol 16 are not described in this description because they are semantically identical or similar to the reliability mechanisms used by TCP.

8. Link Protocol

8.1 Introduction

The link protocol 14 is the lowest level of communications between nodes. It is the first line of defense, dealing with the safety and management of all inter-node data, as well as being the base construct from which QOS is derived. The link protocol 14 is used to:

Verify the identity of the remote node

Prevent the reading and/or modification of data moving over the link

Prevent denial of service attacks based on CPU overloading, table overflows, and make certain that packet insertion cannot damage the transmission of other unmodified packets Define the base QOS measurements used by higher level protocols Create a consistent inter-node transmission mechanism.

Create a reliable sub-channel for higher level protocols to use for control packets The link protocol 14 establishes the identity of both sides and exchanges a symmetric key used for encryption and per-packet verification. Because of the computational complexity of the necessary public key mechanisms used during link establishment, and the danger of a DOS attack based on CPU starving, a node spends only a portion of its CPU on link establishment. To prevent legitimate attempts from being turned away, a computational challenge is implemented to make the DOS attacker unlikely to be able to send 'correct' requests at a reasonable rate. It is assumed that the correctness testing method is fast enough be checked without penalty.

In addition, no state is kept for challenge requests, only for successful challenge replies, thus DOS attacks on in memory tables may also be avoided. Also, cryptographic methods are used to prevent false replies, etc.

All of this complexity is used to transfer a single document, known as a link setup document, which contains the public encrypted and signed symmetric key. One this document is processed, the link is considered established, and a reply is returned. Then the link is used to transfer symmetrically encrypted, cryptographically checksummed packets, along with QOS information, which composes the "activated" portion of the link protocol 14.

8.2 Link Documents 8.2.1 TYPE: LinkSetupBody

The link setup document, introduced above, is used for initial link key exchange. It is an unnamed document. It is signed by the initiating node. Its structure is a single symmetric key, publicly encoded to the destination node.

8.3 Link Document Packetization 8.3.1 TYPE: LinkDocumentPart

A link document part consists of the link setup document, combined with the full identifying documentation of the initiating node, all concatenated together from the link setup documentation. This string of bytes is most likely too large to fit within the link MTU, and thus is broken into parts. These parts are then cryptographically hashed. The initial request contains the hash for each of the parts, allowing the acceptance of the primary request to clear the way for the part, without allowing an intervening attacker to forge data before the key has been exchanged.

An example of the structure for the link document part is illustrated in Table 22 below:

TABLE 22

| Link Document Part | |
| --- | --- |
| U8 | PartNumber |
| VarInterger | PartOffset |
| VarInteger | PartSize |
| ByteSequence | Data |

Referring to Table 22, Part Number is the integer part number of the current part, 0 based index; Part Offset is the offset in bytes of the data portion of this part relative to the entire link documentation set; Part Size is the size in bytes of the data portion; and Data is the actual data of the part. The cryptographic hash of the data is sent with the link initial request as described in more detail below.

8.4 Link Request Type 8.4.1 TYPE: LinkRequest

A link request type contains information about the requester and the hashes of the documentation to follow. The request results in a challenge as described in the next section, and the receiver decides the complexity of the challenge. An example of the format of the link request is shown below in Table 23:

TABLE 23

| Link Request | |
| --- | --- |
| DotPath | RemoteNode |
| U8 | NumberOfParts |
| VarInteger | RequestDocSize |
| Sequence<Hash> | PartHashes |

Referring to Table 23 RemoteNode is the node name of the node requesting, NumberOfParts is the number of actual data parts that form the documentation as describes in the previous section, and RequestDocSize is the total size of all those parts and Part Hashes is the list of hashes of each part, in order of the part number.

8.5 Link Challenge Exchange

The purpose of the link challenge mechanism is to make the requester do work before the link checks the validity of the link documentation, as the storing, reassembly, and cryptographic verification of the link documentation is a non-trivial process and allowing any unverified node to force the checking node into doing such work could result in resource starvation.

To this end, a node may request a 'challenge' from the node it wishes to establish a link with. The node receiving this request makes a new challenge, which is a CPU constrained cryptographic task, and signs the challenge. To continue the protocol, the requesting node returns the signed challenge along with the solution. Note: until it receives the solution, the receiving node does not need to store any state, or perform any large computational functions. Upon receiving an apparent solution, the process of checking the solution is reasonably quick.

The challenge chosen for this version of the protocol is searching for a missing portion of data which results in a particular cryptographic hash. So long as the hash is strong, this results in a brute force search of the unknown data portion. Thus the receiving node may make the challenge as difficult or simple as is desired by changing the number of unknown bits.

To make certain that the challenge was truly chosen by the receiving node, and to make sure that the request the challenge is related to is the same as the request the challenge was sent in response to, the challenge and the request data are cryptographically hashed with a key known only to the receiving node.

8.5.1 TYPE: LinkChallenge

A link challenge type is used to represent the actual cryptographic challenge. An example of its structure is illustrated in Table 24:

TABLE 24

| Link Challenge | |
| --- | --- |
| Sequence<U8> | PrePart |
| U8 | NumberOfBits |
| Hash | Result |

Referring to Table 24, PrePart is the first portion of the data used to make the hash Result and NumberOfBits is the number of additional bits in the hashes pre-image. If the number of bits is not evenly divisible by eight, it is assumed that the final byte has zeros in the low order (less significant) bits.

8.5.2 TYPE: LinkChallengeAnswer

This type represents the answer to a LinkChallenge. It has a type equivalent to Sequence<U8>, which is remaining bytes which when combined with the PrePart of the LinkChallenge create the correct hash.

8.6 Link Packet Types

There are a number of link packet types. Since the link protocol 14 exists immediately above the interface protocol 12, all interface packets arriving are assumed to be link protocol packets. The first byte determines the type of link packet. An example of the names and associated numbers of each link packet type is shown in Table 25:

TABLE 25

| Link Packet Types | |
| --- | --- |
| Name | Number |
| LinkInitialRequest | ? |
| LinkRequestNAK | ? |
| LinkRequestChallenge | ? |

TABLE 25-continued

Link Packet Types

| Name | Number |
| --- | --- |
| LinkChallengeResponse | ? |
| LinkInitialACK | ? |
| LinkInitialNAK | ? |
| LinkPartSend | ? |
| LinkPartNAK | ? |
| LinkFinalACK | ? |
| LinkFinalNAK | ? |
| LinkReliablePacket | ? |
| LinkUnreliablePacket | ? |
| LinkReset | ? |

8.7 Initial Link Setup Protocol

The initial link setup protocol uses the challenge response mechanism to prepare the receiving node to have the link setup documentation transferred to it, while at the same time, forcing the initiating node to do some computational work. It may involve any one of several PDUs, including link initial request, link request NAK, link request challenge, link challenge response, link initial ACK, and link initial NAK.

9. Routing Protocol

The routing protocol 18 is designed to give nodes the information necessary to correctly move circuit establishment requests closer to their final destination. It may also allow nodes to make intelligent choices about the path used based on the metric parameters of the various links and the requirements of the circuit request.

To allow the routing protocol 18 to scale, networks are assumed to be hierarchical in organization. Each node has a node name, and the routing first gets the circuit request to the most general part of the node name, then as the node gets to the most general network, the routing information is more specific, allowing the next portion of the node name to be examined. This process continues until the node arrives at its final destination.

A network of nodes is collectively called a meta-node. If nodes in two different meta-nodes are connected via an edge, then the two meta-nodes are connected via a meta-edge. There is a mechanism to combine multiple links between meta-nodes into a single meta-edge. Edge and meta-edge information is flooded though the network, with certain rules to limit the data to relevant areas. The highest level meta-edge data flood everywhere.

The meta-edge data is generated by special meta-node controller nodes. These nodes have the meta-node key as well as their node key. There may be more than one meta-node controller, as they should all come to the same result, and flooding rate is controlled via each node, thus additional meta-node controllers simply send extra updates that are ignored if they are excessive.

It would be possible to not have meta-node controllers, however, this would require all nodes to contain the meta-node key (bad), or the security of the meta-link data to require only the signature of one node in each meta-node of the meta-link, which is possibly acceptable, but still more open to compromise than the meta-node controller mechanism, since it requires compromise of a controller in each meta-node.

Additionally, the meta-node controller mechanism allows much of the routing computation to be somewhat centralized, while still allowing for full failure handling, since there can in theory be any number of meta-node controllers.

Star networks are related to a meta-node in the illustrated embodiment. However, alternative embodiments may not include this relationship. In addition, nodes in star networks of the illustrated embodiment do not exchange network routing data for the local network, but only communicate with the meta-node controllers to exchange connectivity information.

9.2 Routing State

Before describing the protocol used to moving routing information around, we describe state of nodes, as well as meta-node controllers. A node may be a meta-node controller for any network level, and possibly more than one at a time. If a node is a meta-node controller for a given level it has full routing information for that level. Otherwise, a node has partial routing information for a given level. All nodes have full routing information for the local network segment.

The partial routing information is actually derived from the full routing information. The partial routing information is the only information used to actually route circuit requests. The text below describes the form of the full routing information first, then the partial routing information, then the algorithm to generate the partial information from the full.

9.2.1 Full Routing State Introduction

Full routing information consists of all the edges or meta-edges that are part of the network, along with the metric parameters of each edge, and all the nodes or meta-node which are part of the network, along with the metric parameters of the node-interconnect. For the purpose of this description the words node and edge may possibly mean meta-nodes or meta-edges.

9.2.2 TYPE: EdgeInformation

An edge information type has information about a single edge. Table 26 below shows an example format of the edge information:

TABLE 26

| Edge Information | |
| --- | --- |
| DotPath | NodeA |
| DotPath | NodeB |
| Sequence<CurrentMetricData> | MetricData |

Referring to Table 26, NodeA and NodeB are the two nodes that are connected. At least one of these nodes is in the network for which the full routing information is being stored. The MetricData contains all the most recent total and current free values for the metrics tracked by the edge.

9.2.3 TYPE: NodeInformation

A node information type has information about a single node. Table 27 below shows an example format of the node information:

TABLE 27

| Node Information | |
| --- | --- |
| DotPath | Node |
| Sequence<CurrentMetricData> | MetricData |

Referring to table 27, Node is the node in question. The MetricData describe the internal capacity and current free capacity of the node. This is more relevant for meta-nodes, since the ability to move data from one side of the meta-node to the other may be limited. Capacity is given in terms of the worst inter-link case. That is, is a meta-node connects to three other meta-nodes, A, B, and C, these numbers are the worst case of the meta-nodes ability to move data from A to B, B to C, and A to C.

9.2.4 TYPE: FullRoute Table

A full route table contains full routing data for a given network at a given level. An example of a format for the full route table is shown below in Table 28:

TABLE 28

Full Route Table

| | |
|---|---|
| Set<EdgeInformation> | Edges |
| Set<NodeInformation> | Nodes |

Referring to Table 28, Edges is the set of all the edge information for all edges in the networks, and Nodes is the set of all node information for all nodes in the network.

9.2.5 Partial Routing State Introduction

A partial routing state represents the calculated next-hop routing information specific to a given viewpoint within the network. Given a final destination (to the resolution of the network being routed) it results in a list of the destinations one hop from the current location, along with metric information about the total path metric for each of the next hop possibilities. In addition, in the case of meta-routing data there is another table giving all the neighboring meta-nodes, and the edge nodes one level lower which have a connection to the neighboring meta-nodes and the metric data of that particular lower level edge.

9.2.6 TYPE: NextHopEntry

A next hop entry is a particular possible next hop to reach a certain final destination and the associated full path calculated metric information.

9.2.7 TYPE: InterconnectionEntry

An interconnection entry contains the information about a lower level node or meta-node which acts as an edge node between two meta-nodes, as well as the associated metric data of the actual edge which connects the meta-nodes.

9.2.8 TYPE: PartialRouteTable

A partial route table contains partial routing data for a given network at a given level. An example of the structure for the partial route table is shown in Table 29:

TABLE 29

Partial Route Table

| | |
|---|---|
| Set<NextHopEntry> | NextHops |
| Set<InterconnectionEntry> | Interconnects |

Referring to Table 29, NextHops is the set of all the next hop information calculated. It is assumed that the set is indexed by the FinalDestination variable of the NextHopEntry structure. There may be multiple entries that lead to the same final destination. Similarly, the Interconnects variable is indexed by the NeighborMetallode variable of the InterconnectionEntry type, and again there may be more than one entry.

9.2.9 Conversion Algorithm

The conversion algorithm is in charge transforming full routes into partial routes. To do this, a method is needed to combine parallel and serially arranges QOS metrics. Each QOS metric has a parallel combination algorithm (the total QOS between two point based the QOS on two parallel routes between the points), as well as a serial combination algorithm (the total QOS between two points base on the QOS from the initial point to an intermediate point, and the QOS from an intermediate point to the final point). For example the parallel algorithm for bandwidth is the sum of the two bandwidths, the serial algorithm is the minimum of the two bandwidths.

The conversion algorithm determines for each final destination node, and for each next hop, all the paths to the final node via the next hop. It uses the QOS combination mechanisms to convert the acyclic graph of QOS into a single QOS value, which is associated with the next hop.

9.3 Data Movement Introduction

There are four basic parts to the routing protocol 18. The first is the meta-node controller flooding protocol which lets all the nodes of a meta-node know about node-controllers. The second is the double signing protocol. This is the method by which one half of a edge or meta-edge sends a partially signed edge to other side for checking and co-signing. The third is base data flooding protocol, by which the edge, meta-edge, node and meta-node data is flooded to everyone who need to know. The fourth is the method by which, after using the base data to compute, meta-node controller nodes flood the calculated partial data to the local network.

All the routing packets exchanged by nodes are not really packets per say, but documents which are sent over the reliable portion of the link. As mentioned above, most of these document (with the exception of the cosign requests) are transferred by flooding. Flooding is the process of broadcasting data to everyone on the network who needs to know.

The flooding mechanism works as follows: Each node upon receiving a document from its neighbors checks to see if the document is even relevant to it. If it is not, it is ignored. Next, the node checks if it has seen the same document recently. This is done though a previous document table. To prevent overflow to the table, if a node receives too many documents from a neighbor within a given time, it occasionally drops packets. Either way, if the node has seen the document previously, it drops it. If it is a new, relevant document, the node checks the signature. If it is incorrect, it lowers the allowed data rate for the neighbor from which it received it, as a neighbor should not send a bad document, and the neighbor may be compromised. If all is well, the node checks which neighbors the document is relevant to, and send it to all of those to whom it is likely relevant.

9.4 Controller Flood Protocol

9.4.1 TYPE: ControllerFloodBody

A controller alert protocol lets nodes know about meta-node controllers. The relevancy criteria is whether or not the node belongs to the meta-node the controller is a meta-node controller for. The control alert document body may include a network name of the meta-node that the controller is controller for, and a full node name of the controller node. Obviously, Controller is a more specific dot name of Metallode. The document is signed by the meta-node key for the meta-node in question. A given node remembers at least a few controllers for each level of meta-node which it belongs to. It keeps the closest controllers and drops the further one based on hop count.

9.5 Cosigning Protocol

9.5.1 TYPE: CosignRequestBody

A cosigning protocol is used to get an edge update signed by the other party. It involves the transfer of a document known as the CosignRequest document. This includes edge information from one node being sent to the other to be consigned. It is signed by a NodeA parameter of Edge Info.

A cosign request document is directed closer to the network named in the NodeB portion of the EdgeInfo entry. If the request has already entered the network named, then node uses its information about the controllers to send the document closer to the closest known controller.

9.6 Base Flooding

9.6.1 TYPE: NodeFloodBody

A flood body node is signed by the node or meta-node described in the Node Info, relevant if the name of the node with its first element removed is a generalization of the current node's node name.

9.6.2 TYPE: EdgeFloodBody

A flood body edge is signed by both nodes or meta-nodes described in the EdgeInfo, relevant if either node name with its first element removed is a generalization of the current node's node name.

9.7 Calculated Flooding

9.7.1 TYPE: NextHopFloodBody

The flood body next hop is signed by the meta-node for the network layer it describes, relevant if the signing meta-node is a meta-node of the current node.

9.7.2 TYPE: InterconnectionFloodBody

A flood body interconnection is signed by the meta-node for the network layer it describes, relevant if the signing meta-node is a meta-node of the current node.

10. Circuit Protocols

This chapter defines the protocols used to construct circuits and to move data though circuits. It begins by defining the circuit state tables, which are used by circuit data movement and changed by the circuit establishment process.

10.1 Circuit Routing Tables

The circuit routing tables store the current circuits passing though a node. Each circuit connects a remote node on one interface with a remote node possibly on another interface. Since there may be more than one circuit between any two nodes, there is a CircuitID which is used to distinguish them. This CircuitID is local to the two nodes, that is, it is used only to separate the multiple circuits between two nodes.

10.1.1 TYPE: CircuitID

A Circuit ID identifier allows the separation of multiple circuits between the same node.

The route tables store a relation between the two sides of a circuit, and possibly internal data for QOS accounting and control. A circuit side type represents one side of a circuit where a RemoteInterface represents the particular interface this side of the circuit goes out of, and a RemoteNode is the interface specific RemoteAddress of the other node. An ID corresponds to a CircuitID relative to the inter-node connection.

There is a special interface known as "Local". This is the interface used if one side of the circuit is local.

10.1.3 TYPE: CircuitLink

A circuit link defines a relation between two circuit ends, along with implementation specific data to manage the QOS, etc. The circuit link may have two sides that communicate and an extra implementation specific data.

10.1.4 TYPE: CircuitRouteTable

A circuit route table is a set of circuit links, which is the current set of open circuits.

10.2 Circuit Data Protocol

As discussed in previous sections, the circuit data protocol 22 is the sole protocol which rides over the unreliable link protocol 14. Its framing begins immediately in the data section of the unreliable link. The circuit data protocol 22 basically consists of the CircuitID of the circuit, followed by the actual data being sent over the circuit. The official definition is includes a circuit ID and a byte sequence.

Upon receiving a packet, the circuit is lookup by the ID and the incoming address to find the entry in the circuit route table. If there is no such entry, the packet is silently dropped. If there is an entry, the packet is redirected to the other side of the entry, that is, if the packet arrived via SideA it is sent to SideB and if it arrived at SideB it is sent to SideA. It is sent over the unreliable link protocol 14 if the interface in non-local, or if the interface is the special local interface it is sent to the user.

If no data travels though the circuit for a given time, the node drops the entry in the circuit route table. Keep-alives may be sent by sending empty (0 data length) packets. These are NOT delivered to the user.

10.3 Establishment Protocol

The establishment protocol 20 is used to setup circuits. It involves the movement of a circuit request document thought the network over the reliable link protocol 14. As the circuit request moves, it establishes the circuit. Upon reaching the other side, data can be sent both ways. If the receiving side does not have any initial data to send, it sends a keep-alive to verify the circuit bidirectionally.

10.3.1 TYPE: CircuitRequestBody

A circuit request body contains the actual circuit request. It is signed by the user requesting the circuit be established and includes a destination node, which is the final destination of the circuit; a service name, which is the name of the service desired on the other side (similar to a port number and implementation specific), requirements, which are the QOS and other metric requirements of the circuit; flags, which are the flags for the circuit (e.g., defined are bit 0 (the lowest bit) which is encryption, and bit 1 (second lowest) which is reliability); and a circuit key, which is only part of the structure if the flag for encryption is set. If so, it is the symmetric encryption key, public key encrypted to the recipient.

Immediately following the request document on the reliable link is a structure which represents the unsigned partial metric data from previous hops, along with the CircuitID from the last hop. For example, the max desired bandwidth may be lower if the previous hop could not theoretically support the original, or the required latency may be less based on latency already used.

10.4 Encryption and Reliability

Encryption and reliability layers add additional headers to the circuit packets. Encryption comes before reliability.

11. Document Transfer Protocol

The document transfer protocol 28 is the mechanism used to retrieve a document based on its name and type. The mechanism used is similar to DNS. DTP is run over a circuit, its service name is simply, "DTP". It uses the reliability protocol 16 over the circuit protocol (20 and 22) to provide reliable stream service. It can be run encrypted or not, although it accepting the requested connection is the decision of the DTP server.

Over the OTP link, document requests are sent, and documents are returned. There is a redirection process, which causes the user to be pointed to another DTP server. Instead, the primary DTP server can also recursively perform additional lookups itself and return the results directly. This decision is left to the implementer, and could be based on the user requesting, the originating node, etc.

An example of a document request is shown in Table 30:

TABLE 30

| Document Request | |
|---|---|
| U8 | Options (Reserved, set to 0) |
| DocumentType | Type |
| DotName | Name |

The document request arrives over the reliable link as shown above. If the DTP server knows the value of the current document, it returns it, which simply means sending the document over the reliable link.

Otherwise, there are two special types of documents which may be used to redirect. The first is the logical name document 11.0.1 TYPE: LogicalNameBody The logical name document redirects the document (e.g., its key and the type described in its body) to another document of the same type with a different key. The logical name document is signed by an identity equal to or more general than its key.

Note: Unlike most documents, there can be more than one redirection document with the same key, so long as they are redirecting different types of documents.

The other, more important mechanism for redirection is the document location mechanism. The document location mechanism allows certain portions of the dot path tree to be related to certain DTP servers. If a server does not know the document, it can redirect toward a server that does. At worst, the root DTP servers know the identity of the authoritative machines for the more general portions of the sub-tree. Each of the sub-tree nodes either knows the document or knows another more specific source, until the document is resolved.

11.0.2 TYPE: DocumentLocationBody

This is a pointer for a given portion of the dot path tree to a document server. If there are multiple records that are more general than the record being lookup up, the most specific one is used. All DTP servers have the location of one or more root servers. All servers authoritative for a given sub-tree have all documents therein, or more specific location documents for all the sub-trees of their sub-tree that they do not hold the full data for.

The key of the document location document is the sub-tree served. The document is signed by an identity equal to or more general than its key. There can also be more than one document location document for the same key, since there can be multiple redundant, fully authoritative servers.

12. Optional Extensions 12.1 Multicast Extension

This extension is used to allow a single node to broadcast the same stream of data to multiple nodes in an efficient manner. To allow this, the format of a circuit is modified slightly for multicast circuits (which are kept in a separate table from normal circuits). At each node, a circuit instead of connecting a single CircuitSide to another single CircuitSide, connects one "root" side to one or more "branch" sides.

In addition, there is a Channel which is unique to the sending node, and is used along with the sending node to key multicast flows for combination purposes.

12.1.1 Data Flow

When circuit data is received on the root side, it is duplicated and sent out to each of the branch sides. No actual data flows in the reverse direction (from branch to root), but there may be empty keep-alives to keep the circuit open. When a keep-alives is received via a branch, it is forwarded toward the root if there has not been a keep alive from that branch for one half the circuit timeout value, otherwise it is dropped. When a node has not received a keep-alive from a given branch for the timeout time, it drops the branch. It there are no more branches, the entry in the multicast table is removed.

12.1.2 Circuit Establishment

Multicast circuits are routed from the root outward. Thus if a node wishes to join the multicast it sends a multicast prerequest document (defined below) to the multicast sender requesting that it join the multicast. Once this is done, or in the case of the multicast sender initiating, the multicast sender sends a Multicast Request document, which travels outward. It is routed like a circuit request with two exceptions:

1. Upon receiving a multicast request from the same initial sender via the same side, a branch is made toward the destination, not a new circuit.
2. There may be an additional routing preference toward send data toward the same path as an existing branch.

12.1.3 TYPE: MulticastPreRequestBody

A multicast prerequest body document is sent to a nonsender to request a circuit establishment be made in an outgoing direction. It is forwarded toward the SendingNode and are signed by the requesting user. An example of a structure associated with this document is shown in Table 31:

TABLE 31

Multicast Prerequest

| DotName | DestinationNode |
| DotName | SendingNode |
| DotName | Channel |
| MetricRequirements | Requirements |
| U8 | Flags |
| PublicEncrypted | Circuitkey |

Referring to Table 31: DestinationNode is the final destination of the circuit;

SendingNode is the node multicasting, the destination for this pre-request; Channel is the name of the channel desired on the other side;

Requirements are the QOS and other metric requirements of the circuit; and Flags is the flags for the circuit, currently defined are bit 0 (the lowest bit) which is encryption. Circuit-Key is only part of the structure if the flag for encryption is set. If so, it is the symmetric encryption key, public key encrypted to the recipient.

12.1.4 TYPE: MulticastReauestBody

A multicast request body is sent via the sender to establish a circuit. Signed by the sending node. Followed by a PreRequest, either the one sent to initial this request, or one made up by the sender.

12.1.5 Destruction

On receiving a circuit terminate request from one of the branches, the circuit terminate request is forwarded, and the circuit destroyed, if there is only one branch. If there is more than one branch, the branch in question is simply removes. A circuit terminate request from the root is forwarded to all branches, then the circuit is removed.

12.2 Automatic Splitting

Automatic splitting is a process by which a larger metanode can split into various smaller meta-nodes. It is useful for large networks. To accomplish this mechanism a new type of meta-node is made, called a 'logical' meta-node. This differs from the standard 'administrative' meta-node, which is established by out of band key exchange. The logical meta-node gets its authority from a number of nodes within the logical meta-node. This involves a new document, called the petition document, which establishes the logical meta-node key, and is signed by many members of the same administrative metanode, which the logical meta-node is a sub-part of. Additionally, these same nodes (the signers) are given new identities signed by the logical meta-node key.

This allows the creation of a logical network controller, which is a node that is promoted to the network controller status by having its key signed by its peers as per above. These logical network controllers can be ineffective, but not destructive. The reason is that the two purposes of the network controller: aggregate routes, and signing inter-meta-node links, both can be verified externally. In the case of route aggregation, each node can do route aggregation themselves, and may from time to time do so to check the current logical network controller and deny further support (let their current signature timeout) of the NC in the future. The information about inter-meta-node connectivity is not propagated unless the other side of the meta-node link cosigns, which will not happen if the results are incorrect.

In the case where nodes determine that a logical NC is behaving badly, they can create another. So long as there is at least one functioning NC within the meta-node, all should work correctly and the malfunctioning (or malicious) NC has no effect.

The actual process of a split involves (1) turning an administrative or logical meta-node, which is composed directly of node (lowest level), into multiple smaller meta-nodes that form the main meta-node (leveling) or (2) breaking a current logical meta-node into more than one logical meta-node (dividing).

In both these cases, an NC decides that a split is desirable. In the first case, it is the higher level NC, and in the second, the NC which is sub-dividing. This involves a split-request message. This message (which is a document signed by the NC) is sent to the closest administrative NC (if the current NC is a logical NC) for a co-signature, then flooded though the meta-node, and contains information regarding the reassignment of the nodes currently in its meta-node (which node to which sub-group), and the administrative name of the suggested NC's for each sub-group, as well as the network names. The split request specifies a time when the split is to occur. In the case of a node receiving multiple split requests, the one which is to occur the SOONEST is selected, exact identical times are disambiguated via the dictionary ordering of the sending NC's node name.

Before the split is set to occur, nodes sign the new logical NCs petition document, as well as receive their new identity keys from the logical NC. These keys are the administratively assigned local portion of the node, followed by the new networks full name, and are signed by the NC's petition key.

An example of this process is as follows:
1. The splitting meta-node's network control sends a split request directly to the closest administrative network controller (unless it is the nearest ANC)
2. The ANC cosigns the request and floods it.
3. The newly selected LNC's as well as non-endorsed nodes that so desire, send a 'network-controller-petition' message, containing the node's public key to all nodes involved.
4. Each node selects one or more candidates, and signs the petition
5. Upon receiving the signature, the meta-node in question signs with its petition key the new identity of the node and returns it to the node in question
6. Upon receiving the minimum required votes, the candidate node sends its signed petition to the nearest ANC
7. The ANC signs a LNC key for the newly appointed candidate, and send it back.
8. The new LNC floods the local network with its signed LNC key document, it is now a logical node controller.
9. If none of a node's candidates has achieved a high enough vote count by the time the end of the election (the beginning of the split) is set to occur, the node chooses one or more of the candidates that has a high enough vote count, and signs its petition and receives its identity from it
10. If no candidates achieves the minimum required voted before the time specified, the split is canceled.

12.2.1 Division Choice Function

While the network control which initially decides to split can choose any method to decide the organization of the split (in the sense of which nodes go to which side) it may be limited by requirements and/or optimization criteria. For example, each sub-group be fully internally connected, that is, each member of a sub-group can reach every other member without leaving the sub-group. Additionally, there may be a number of criteria which makes some breakdowns more desirable.

To find a good breakdown a modified method of simulated annealing is suggested. First, a fitness is chosen which gives a value to each possible breakdown, an example might be:

$$w1(N_a - N_b)_2 + w2(\text{Avg}(\text{Bandwidth}(X) : \delta \text{Inter})/\text{Avg}(\text{Bandwidth}(X) : x \in \text{Intra})$$

where the set Inter is the set of inter-group connections, and Intra is the set of intra-group connections, Bandwidth(X) is a function that measures bandwidth, $w_1$ and $w_2$ are weights, and $N_a$ and $N_b$ are the number of nodes in each sub-group. The goal is to minimize the value of the fitness function. This function is normalized to a value between 0 (best) and 1 (worst).

An example of an annealing method follows:
1. All nodes are initially put in sub-group A, with the exception of one randomly chosen node on the edge of the original group is put in sub-group B
2. The temperature T is initialized to 1
3. A random edge node (one which is on the edge of a sub-group) is chosen for evaluation
4. If the edge node when switched from group A to B leaves the resulting breakdown in a legal state (each group fully internally connected, at least one node in each group), the fitness of the original is evaluated, called $F_{orig}$ as is the fitness of the network with the chosen node switched $F_{new}$.
5. The node is switched with a probability of $0.5 + (F_{orig} - F_{new})/T$
6. 6. Steps 3 to 5 are repeated with continuously falling temperatures.
7. The final temperature is fixed at zero, and all edge nodes are evaluated until the system stabilizes 12.2.2 Split Document Details 12.2.3 TYPE: SplitRequestBody A split request body document is sent via the NC desiring to split the network under its control. It is signed by the NC for its trip to the ANC if needed, and cosigned by the ANC before it is flooded. An example for the structure of this document is shown below in Table 32:

TABLE 32

| Split Request | |
|---|---|
| DotPath | SplittingNode |
| Set<DotPath> | SuggestedNCs |
| Set<DotPath> | SubGrouA |
| Set<DotPath> | SubGroupB |
| TimeLocation | SplitTime |
| VarInteger | RequiredVotes |
| U8 | SplitType |

12.2.4 TYPE: ControllerPetitionBody

A controller petition body document represents the candidacy of a given node in relation to a split (which follows this document). This document is signed by the candidate and sent (with the required number of votes as signatures) to the ANC once a candidate has received sufficient votes. This document is also sent signed by a single node to represent a vote cast by that node. An example for the structure of this document is shown below in Table 33:

TABLE 33

Controller Petition Body

| DotPath | CandidateName |
| SymetricHash | HashOfSplitRequest |
| PublicKey | TheKey |

12.2.5 TYPE: LogicalKeyAssignment

The logical key assignment document is a document sent by the a candidate, signed by their logical key, to nodes which have voted for it. An example for the structure of this document is shown below in Table 34:

TABLE 34

Logical Key Assignment

| DotPath | LogicalName |
| DotPath | AdministrativeName |

12.2.6 TYPE: LogicalNetworkControlAuthorization

The logical network control authorization document is sent by the ANC once it is given a Controller Petition signed by the proper number of nodes. An example for the structure of this document is shown below in Table 35

TABLE 35

Logical Network Control Authorization

| DotPath | CandidateName |
| PublicKey | TheKey |

CONCLUSION

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps or components are presented in a given order, alternative embodiments may perform routines having steps or components in a different order. The teachings of the invention provided herein can be applied to other systems, not necessarily the network model described here. The elements and acts of the various embodiments described above can be combined to provide further embodiments and some steps or components may be deleted, moved, added, subdivided, combined, and/or modified. Each of these steps may be implemented in a variety of different ways. Also, while these steps are shown as being performed in series, these steps may instead be performed in parallel, or may be performed at different times.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words in the above detailed description using the singular or plural number may also include the plural or singular number respectively. Additionally, the words "herein," "above," "below," and words of similar import, when used in this application, shall refer to this application as a whole and not to any particular portions of this application. When the claims use the word "of" in reference to a list of two or more items, that word covers all of the following interpretations of the word: any of the items in the list, all of the items in the list, and any combination of the items in the list.

The teachings of the invention provided herein could be applied to other systems, not necessarily the system described herein. These and other changes can be made to the invention in light of the detailed description. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above detailed description. While the above description details certain embodiments of the invention and describes the best mode contemplated, no matter how detailed the above appears in text, the invention can be practiced in many ways. Details of the network model and its implementation may vary considerably in their implementation details, while still being encompassed by the invention disclosed herein. As noted above, particular terminology used when describing certain features, or aspects of the invention should not be taken to imply that the terminology is being re-defined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

The invention claimed is:

1. A system for organizing without central administration of a network of non-trusting computing devices so that the computing devices can securely share network resources and communicate with each other, comprising:

a recipient computing device; and
a sending computing device that sends a signed circuit establishment request to the recipient computing device via the network of non-trusting computing devices,
wherein the sending computing device communicates the circuit establishment request comprising a first identity document and a computational challenge to the recipient computing device, wherein the first identity document identifies the sending computing device to the recipient computing device, and wherein the first identity document includes a first public key signed by the sending computing device, and wherein the first public key is associated with a first private key known only to the sending computing device;

wherein the recipient computing device communicates a signed challenge with a solution and a second identity document to the sending computing device, wherein the second identity document identifies the recipient computing device to the sending computing device, wherein the second identity document includes a second public key signed by the recipient computing device, and wherein the second public key is associated with a second private key known only to the recipient computing device, wherein the solution of the signed challenge includes a missing portion of data which results in a cryptographic hash that is to be computationally solved by the sending computing device to complete the circuit establishment;

wherein the sending computing device solves the signed challenge by computing the missing portion of data of the solution of the signed challenge, wherein the first private key and the first public key unique to the first identity document identify the sending computing device to the recipient computing device;

wherein the second private key and the second public key uniquely identify the recipient computing device to the sending computing device;

wherein a communications circuit is established between the sending computing device and the recipient computing device in response to the recipient computing device identifying the sending computing device based on the first identity document, in response to the sending computing device identifying the recipient computing device based on the second identity document, and in response to the sending computing device computationally solving the received signed challenge, wherein the recipient computing device saves challenge/response state information associated with the sending computing device only in response to the sending computing device computationally solving the received signed challenge, such that no challenge/response state information is kept for challenge requests, only for successful challenge responses, wherein, in response to the recipient computing device sending the sending computing device the signed challenge, the sending computing device determines the missing portion of data of the cryptographic hash, wherein the determined missing portion of data computationally is used to solve the challenge, and wherein the sending computing device determines the missing portion of data of the cryptographic hash by performing a brute force search for a number of missing bits of the cryptographic hash, wherein the number of missing bits are specified by the signed challenge.

2. The system of claim 1, wherein the sending computing device sends a packet to the recipient computing device using a hierarchical dynamic routing protocol.

3. The system of claim 2, wherein the hierarchical dynamic routing protocol propagates quality of service information to each intermediate computing device.

4. The system of claim 2, wherein the hierarchical dynamic routing protocol employs a cryptographic method to encrypt communications.

5. The system of claim 2, wherein the sending computing device sends a document that is used by at least one of the recipient computing device and intermediate computing devices to make decisions.

6. The system of claim 5, wherein the document describes a quality of service.

7. The system of claim 6, wherein the document further describes rights and delegations of rights for usage of the network by at least one of the recipient computing device and the intermediate computing devices.

8. The system of claim 5, wherein the document describes a delegation of a permission.

9. The system of claim 8, wherein the delegation of the permission enables at least one of the recipient computing device and the intermediate computing devices to make a data movement decision.

10. The system of claim 2, wherein the hierarchical dynamic routing protocol can use either a reliable or unreliable underlying communications protocol.

11. The system of claim 1, wherein the network is organized as a hierarchical mesh network.

12. The system of claim 11, wherein the sending computing device, the recipient computing device, and intermediate computing devices of the hierarchical mesh network are each identified by a name comprising a set of identifiers separated by a separator.

13. The system of claim 12, wherein the identifiers are organized in the name from specific to general.

14. The system of claim 11, wherein the hierarchical mesh network includes a meta-node.

15. The system of claim 14, wherein the meta-node indicates a computing device and a network of computing devices, and wherein the indicated computing device and the indicated network of computing devices represents peers in a hierarchy.

16. A method comprising:
sending, from a sending computing device, a signed circuit establishment request to a recipient computing device via a network of non-trusting computing devices, wherein the signed circuit establishment request includes a first identity document that identifies the sending computing device to the recipient computing device, and wherein the first identity document includes a first public key signed by the sending computing device, and wherein the first public key is associated with a first private key known only to the sending computing device;

receiving, at the sending computing device, a second identity document communicated from the recipient computing device, and wherein the second identity document identifies the recipient computing device to the sending computing device, wherein the second identity document includes a second public key signed by the recipient computing device, wherein the second public key is associated with a second private key known only to the recipient computing device;

computing, at the sending device, the missing portion of data of the solution of the signed challenge to solve the signed challenge;

establishing a communications circuit between the sending computing device and the recipient computing device in response to the recipient computing device identifying the sending computing device based on the first identity document, in response to the recipient computing device sending the sending computing device a signed challenge with a solution that includes a missing portion of data which results in a cryptographic hash that is to be computationally solved by the sending computing device, in response to the sending computing device identifying the recipient computing device based on the second identity document, and in response to the sending computing device computationally solving the received signed challenge; and in response to the recipient computing device sending the sending computing device the signed challenge, determining, by the sending computing device, the missing portion of data of the cryptographic hash, wherein the determined missing portion of data computationally is used to solve the challenge, wherein the recipient computing device saves challenge/response state information associated with the sending computing device only in response to the sending computing device computationally solving the received signed challenge, such that no challenge/response state information is kept for challenge requests, only for successful challenge responses, and wherein determining, by the sending computing device, the missing portion of data of the cryptographic hash includes performing a brute force search for a number of missing bits of the cryptographic hash, wherein the number of missing bits are specified by the signed challenge.

17. The method of claim 16, further comprising:

sending a packet from the sending computing device to the recipient computing device using a hierarchical dynamic routing protocol.

18. The method of claim 16, further comprising:

sending a document from the sending computing device to the recipient computing device, wherein the document is used by intermediate computing devices to make decisions.

19. The system of claim 18, wherein the document describes rights and delegations of rights for usage of the network by at least one of the recipient computing device and the intermediate computing devices.

20. The system of claim 18, wherein the document describes a delegation of a permission, and wherein the delegation of the permission enables at least one of the recipient computing device and the intermediate computing devices to make a data movement decision.

* * * * *